W. Adamson,

Drying Wet Fabrics.

No. 109,706.   Patented Nov. 29, 1870.

Witnesses: Jno. B. Harding, John Parker

Wm. Adamson
by his Atty
Howson and Son.

United States Patent Office.

WILLIAM ADAMSON, OF PHILADELPHIA, PENNSYLVANIA.

Letters Patent No. 109,706, dated November 29, 1870.

IMPROVEMENT IN DRYING DISINTEGRATED FIBERS.

The Schedule referred to in these Letters Patent and making part of the same.

I, WILLIAM ADAMSON, of Philadelphia, county of Philadelphia, State of Pennsylvania, have invented an Improved Process of Treating Wet Fibers, of which the following is a specification.

Nature and Object of the Invention.

My invention consists of a process, too fully explained hereafter to need preliminary description, of treating the disintegrated and saturated fibers of cane-stalks, and other wet vegetable fibers, so as to simultaneously cleanse and dry the same, and thereby reduce them to a proper condition for packing and transportation to localities where they may be available as paper-stock or applied to other useful purposes.

Description of the Accompanying Drawing.

Figure 1:
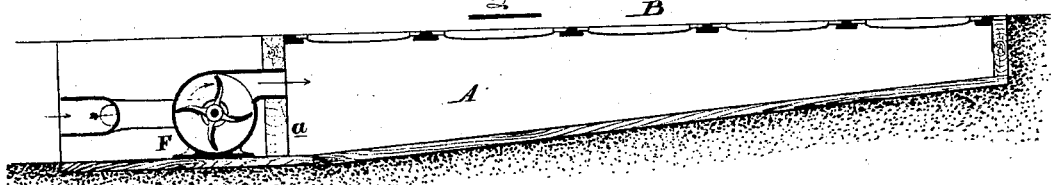
Figure 2:
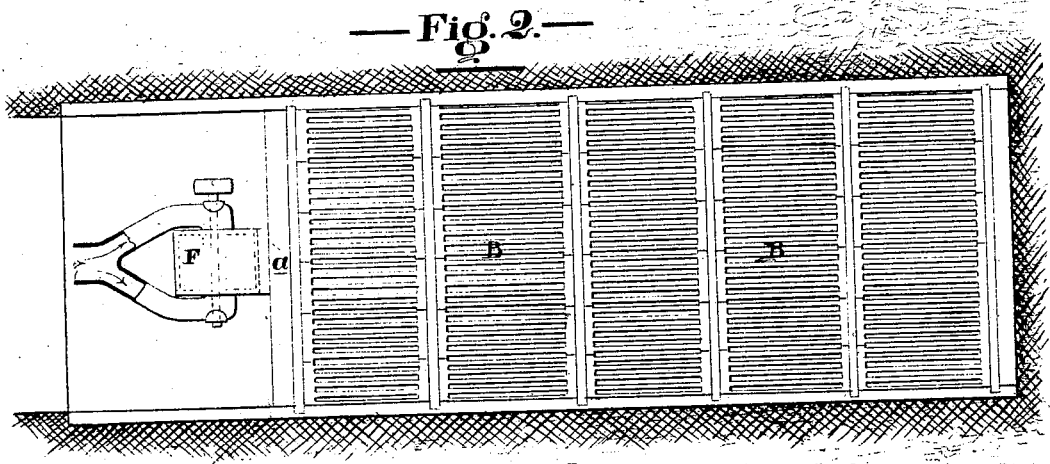

Figure 1 is a vertical section of apparatus for carrying my invention into effect, and
Figure 2, a plan view of the same.

General Description.

The fibers of cane are especially useful as paper-stock, and can be applied with advantage to other purposes.

The mode of disintegrating the cane-stalks by the application of steam is well known, the result of this process being masses of saturated fibers, intermixed with pith or other foreign matter.

Much inconvenience has been experienced in transferring these fibers from the localities in which the cane abounds to the manufacturing districts, owing to the difficulty of thoroughly drying the saturated masses and depriving them of the foreign matter, and thereby reducing them to a condition suitable for being packed and transported.

To overcome these difficulties is the object of the invention, which I will now proceed to describe.

A chamber, A, which I prefer to make deeper at one end than at the other, is formed in the ground, and suitably lined with brick or other appropriate material, and this chamber is covered with a series of bars forming a grating, B, which may, for convenience, be level with the surface of the ground.

Heated products of combustion are drawn by a fan, E, or other equivalent mechanism, from any adjacent furnace, and forced through the rear wall $a$ of the chamber A into the latter.

After the cane-stalks have been disintegrated by the process referred to above, much of the pith and other foreign matter which adheres to the fibers, and impairs their utility as paper-stock, may be removed by washing, but particles continue to be attached to the fibers, and can be most effectually removed by the application of heat.

The saturated fibrous masses are placed in a layer on the grating B, and being then subjected to the heated products of combustion or to heated air, the water which they had absorbed is rapidly evaporated, and during this evaporation the adherent foreign particles, which would otherwise remain, are loosened and separated from the available fibers. In other words, the fibers are simultaneously cleansed and dried, and thereby reduced to an appropriate condition for transportation.

My invention may be applied with advantage to the treatment of other saturated vegetable fibers.

Claim.

The process herein described of treating saturated fibers.

In testimony whereof, I have signed my name to this specification in the presence of two subscribing witnesses.

WM. ADAMSON.

Witnesses:
WM. A. STEEL,
FRANKLIN B. RICHARDS.